Feb. 19, 1929.　　　　　　　　　　　　　　　　　　1,702,904
G. W. JOHNSON
LOADING AND UNLOADING DEVICE FOR CENTRIFUGAL EXTRACTORS
Filed April 5, 1922　　　4 Sheets-Sheet 2

INVENTOR
George W. Johnson
BY Brockett + Hyde
ATTORNEYS

Feb. 19, 1929.  
G. W. JOHNSON  
1,702,904  
LOADING AND UNLOADING DEVICE FOR CENTRIFUGAL EXTRACTORS  
Filed April 5, 1922  4 Sheets-Sheet 3
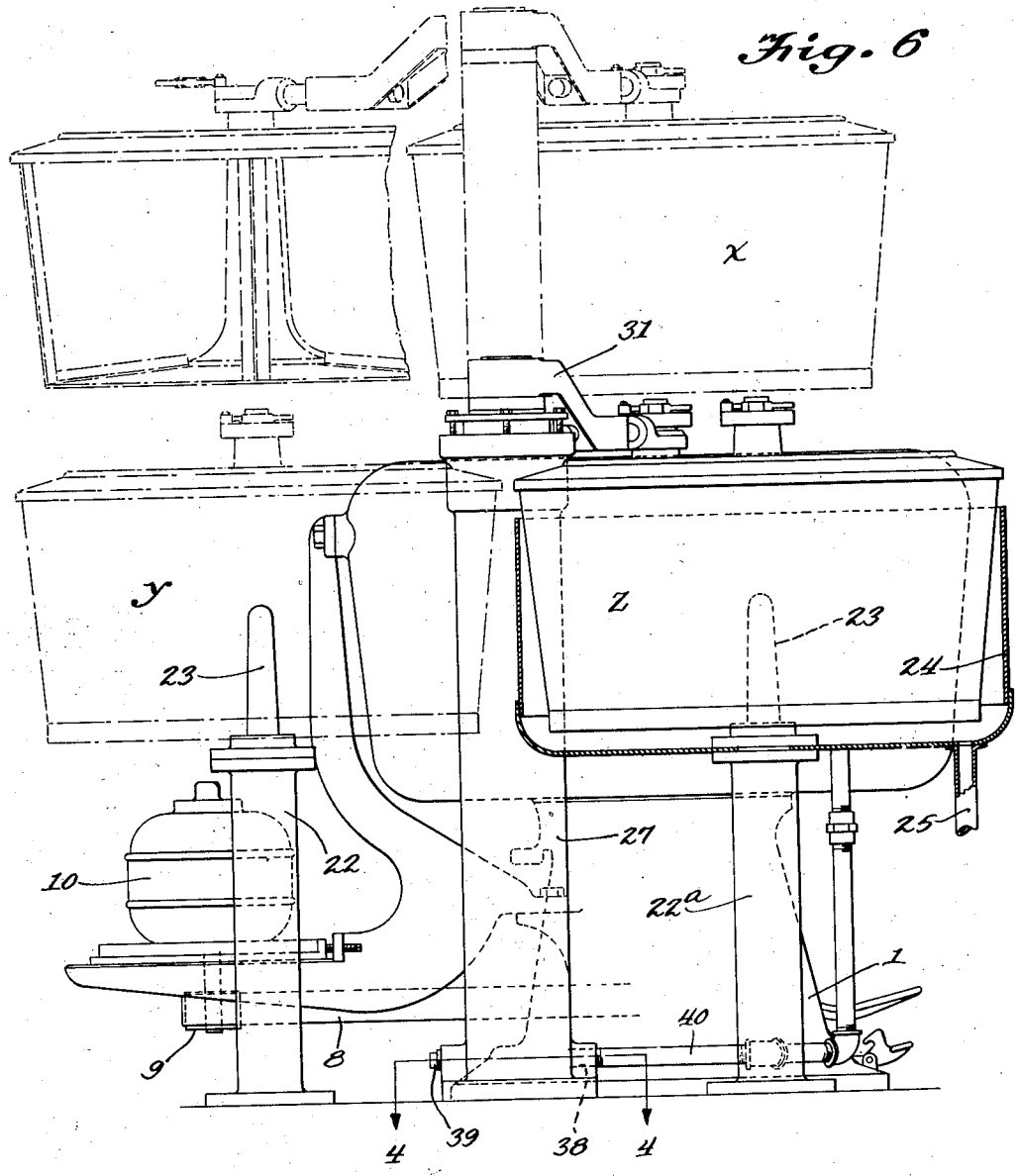
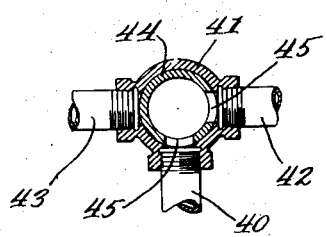
INVENTOR  
George W. Johnson  
BY Brockett & Hyde  
ATTORNEYS Feb. 19, 1929.                                               1,702,904
G. W. JOHNSON
LOADING AND UNLOADING DEVICE FOR CENTRIFUGAL EXTRACTORS
Filed April 5, 1922        4 Sheets-Sheet 4
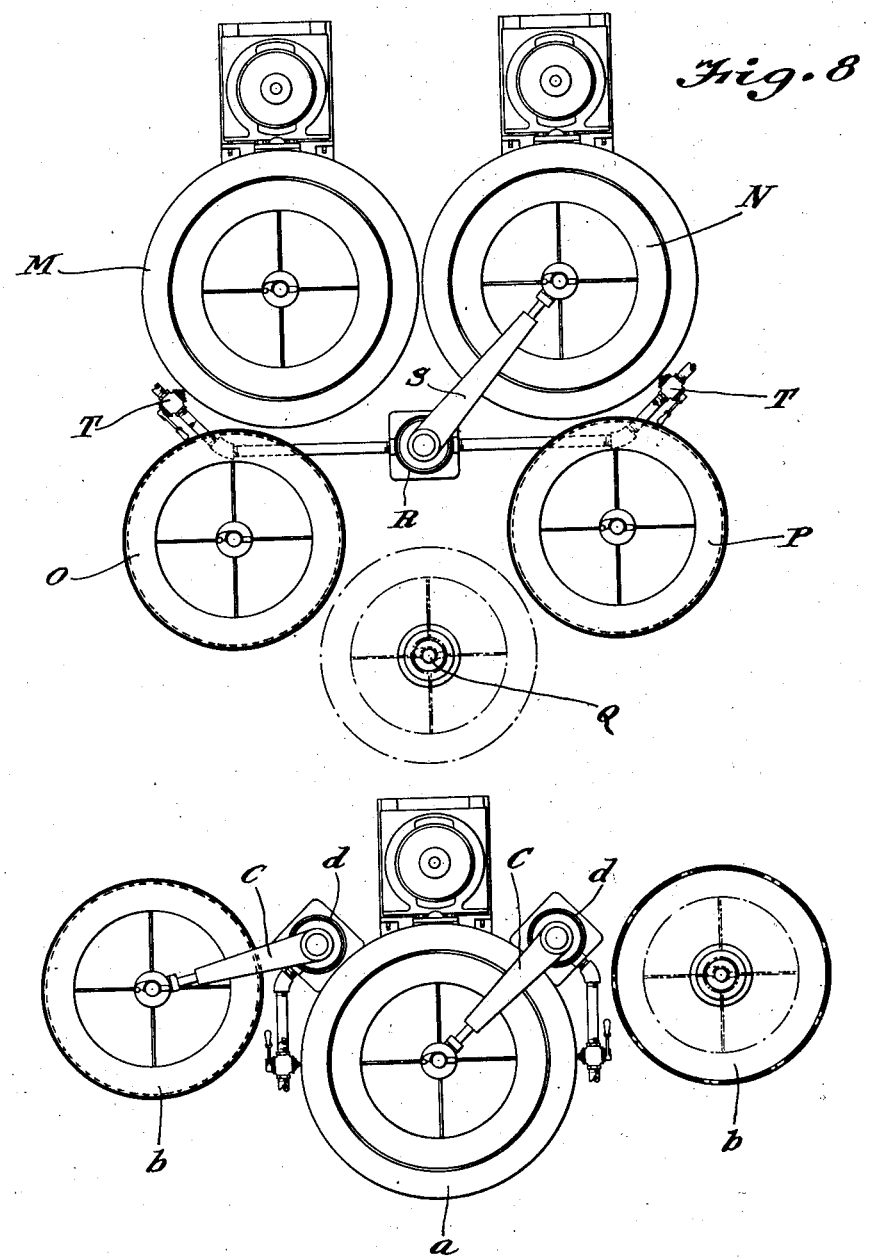

Patented Feb. 19, 1929.

1,702,904

UNITED STATES PATENT OFFICE.

GEORGE W. JOHNSON, OF NORWOOD, OHIO, ASSIGNOR TO THE AMERICAN LAUNDRY MACHINERY COMPANY, OF CINCINNATI, OHIO, A CORPORATION OF OHIO.

LOADING AND UNLOADING DEVICE FOR CENTRIFUGAL EXTRACTORS.

Application filed April 5, 1922. Serial No. 549,891.

This invention relates to devices for use in loading and unloading centrifugal extractors for drying wearing apparel or fabrics of any kind, either after washing in a laundry or in a dry cleaning operation, or for extracting liquids from other materials for other purposes.

The object of the invention is to provide apparatus including an extractor equipped with two or more interchangeable containers for the goods being extracted, one of which is available for unloading and reloading while the other is in use in extracting a batch of material, together with the proper mechanism for handling said containers, all for the purpose of increasing the efficiency of the extractor and securing from it in a given time more duty than has heretofore been available.

Figure 1:
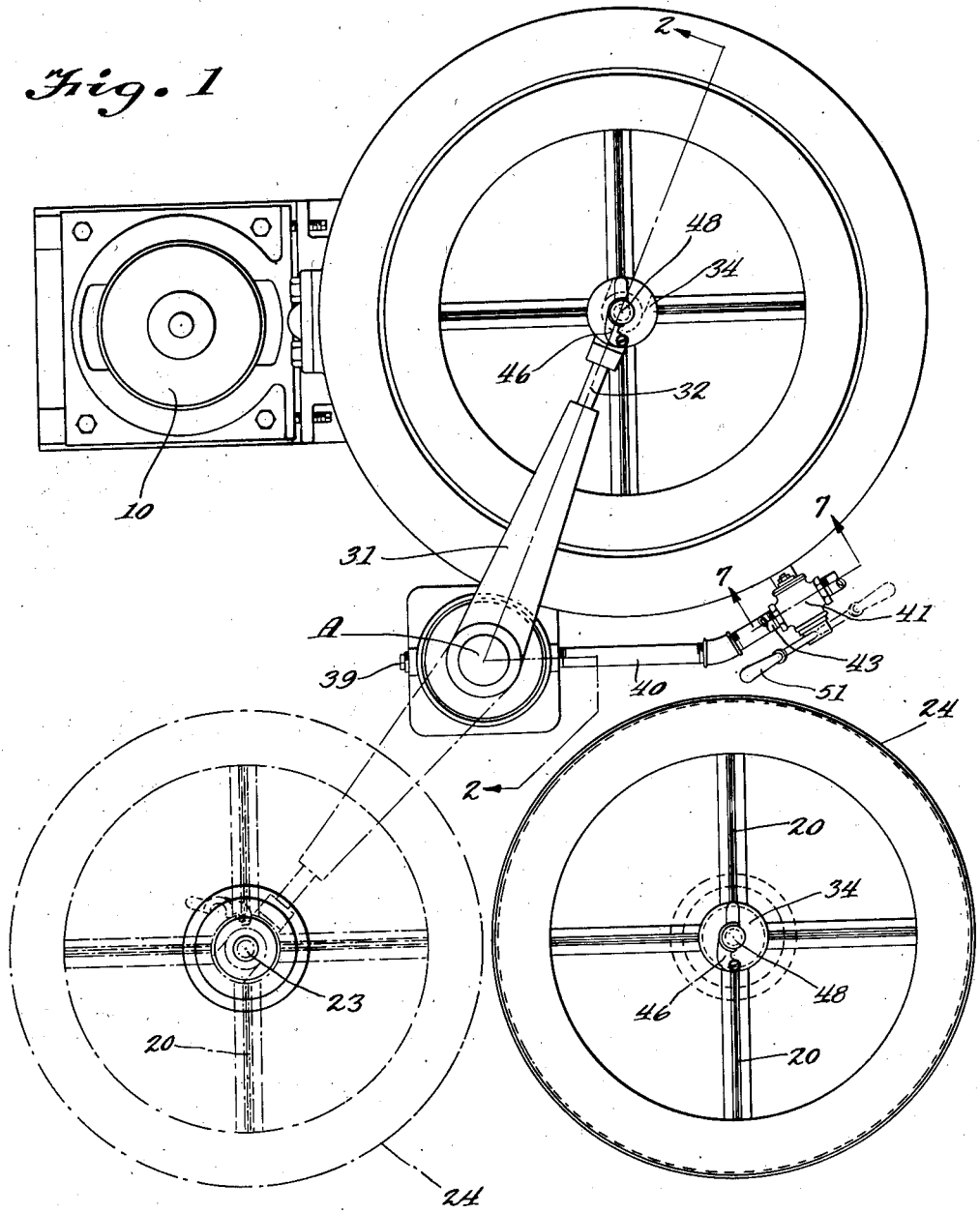
Figure 2:
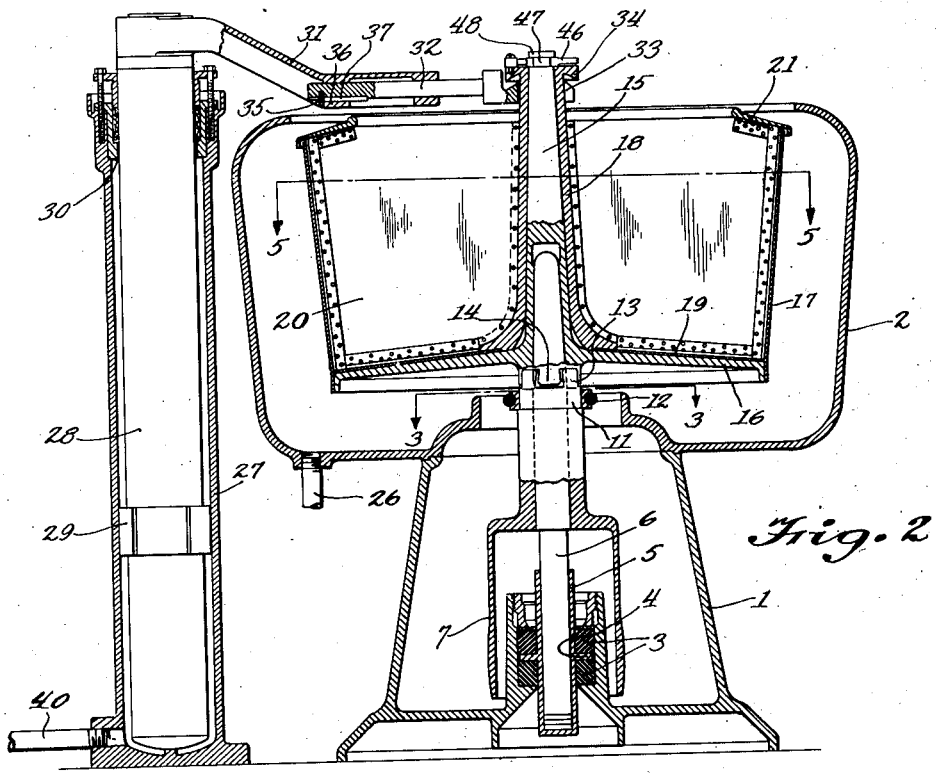
Figure 4:
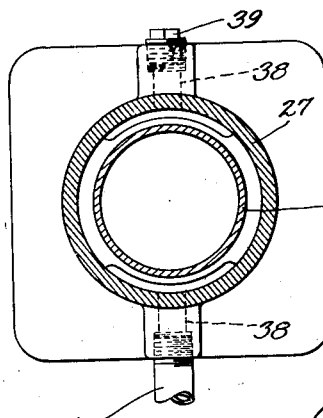
Figure 3:
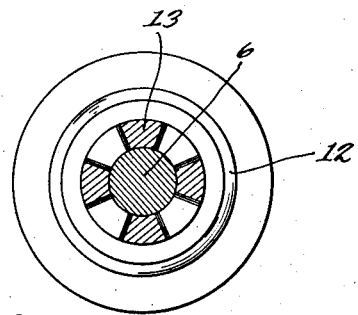
Figure 5:
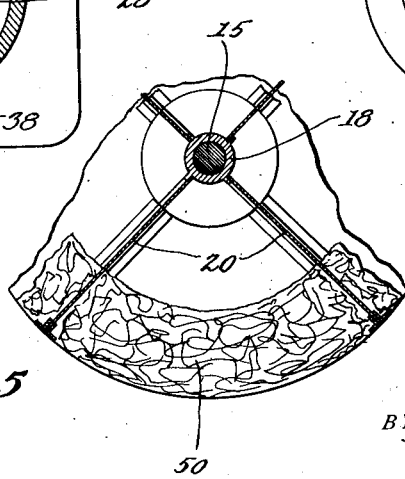

In the drawings, Fig. 1 is a plan view of one form of apparatus embodying the invention; Fig. 2 is a sectional elevation on the line 2—2, Fig. 1; Fig. 3 is a detail sectional plan view on the line 3—3, Fig. 2; Fig. 4 is a detail sectional plan view on the line 4—4, Fig. 6; Fig. 5 is a sectional plan view through the cage or container on the line 5—5, Fig. 2; Fig. 6 is a side elevation, the view being taken from the bottom in Fig. 1, and showing a tub in sectional elevation; Fig. 7 is a sectional view through a valve on the line 7—7, Fig. 1; and Figs. 8 and 9 are plan views, illustrating other arrangements of apparatus embodying the invention.

Referring first to Fig. 2, the apparatus of the present invention includes a suitable extractor, of which many forms are available. The one shown in the drawings comprises a stationary hollow frame 1 carrying an outer curb 2 and provided with the usual cushions 3 supporting a flange 4 of a hollow sleeve 5 in which is journalled the rotatable spindle 6 to which is attached a belt pulley 7 driven by a belt 8 (Fig. 6) from pulley 9 on the shaft of an electric motor 10. Any other driving arrangement for the spindle would be suitable for the purpose. Attached to the hub of the pulley 7 is a clutch collar 11 surrounded by a rubber bumper 12 and provided with clutch teeth 13 which may be slightly undercut or inclined as shown, said clutch teeth being adapted to engage and drive clutch teeth 14 on the lower portion of the basket stem 15, which is hollowed out to sleeve over and fit the extended upper end of spindle 6. The basket itself includes the usual floor 16 and a foraminous or perforated outer wall 17 forming a chamber within which is located a suitable cage for receiving and distributing in the container the goods to be extracted. This cage includes a central sleeve portion 18 telescoping over the stem 15, a floor 19 resting upon the floor 16, and a series of radially extending vertically disposed partitions or dividing walls 20, four being shown, which divide the chamber or space within the basket into a number of separate compartments. Attached to the cage is a top ring 21, which moves with it and which prevents any of the liquid being extracted from working upwardly, and also serves as a support for a suitable cover, (not shown) if one is used.

From the foregoing it will be observed that the cage, basket and spindle are assembled by relative telescoping movement, as a result of which the cage alone may be lifted vertically from the basket, and the basket from the spindle, or the cage and basket together may be lifted from the spindle. This arrangement is provided for conveniently handling the basket and cage during loading and unloading, and in substituting or interchanging containers for each other.

To further carry into effect the principle of the invention, I provide adjacent to each extractor one or more temporary supports for the cage and basket, with which supports said cage and basket may be assembled for loading and unloading. For example, in Figs. 1 and 6, the apparatus shown includes two stationary posts or columns 22, 22ᵃ each provided with an upwardly extending stem 23 corresponding in size and shape to the upper end of the spindle 6, and one of which posts or columns also supports a hollow tub 24 slightly larger than the extractor basket, so that the latter can be introduced into the tub to a seat on the column, as shown in Fig. 6. Said tub may also be provided with a drain pipe 25 to the sewer, such a drain 26 being also provided for the extractor curb, as is usual. The two posts or columns 22, 22ᵃ and the extractor shaft 6 are preferably spaced along the arc of a circle described about a suitable center, such as the center A, Fig. 1, or at least said posts and spindle are distributed fairly closely along such an arc. This is for the purpose of enabling the cage or basket or both to be readily manipulated and swung from place to place by an arm swinging about said center, as will more fully appear. In the arrangement shown, at said center A is located on a vertical axis a stationary hollow cylinder 27 within which is a sliding piston 28 normally resting upon a stop at the bottom of the cylinder and having a collar or abutment 29 adapted to engage a shoulder 30 at the packed top of the cylinder to limit upward piston motion. On said piston and either rotatable with said piston in the cylinder or rotatable upon said piston, as may be desired, is a swinging arm 31 in the outer end portion of which is a longitudinally slidable forked rod 32 having arms 33, the upper surfaces of which are tapered or convex, as shown in Fig. 2, to engage an undercut flange or collar 34 on the upper end of the cage sleeve 18. In Fig. 2 the rod 32 is extended to its outermost position, its motion in that direction being limited by a stop screw 35 engaging an abutment 36 on the arm, while rotation of the rod in said arm is prevented by a key 37.

For actuating the piston cylinder 27 is provided with suitable fluid pressure connections, such as two oppositely disposed ports 38, one of which in Fig. 6 is closed by a plug 39, while the other communicates by a pipe 40 with a suitable controlling valve. The valve, shown in Fig. 7, comprises a casing 41 communicating with a fluid pressure supply pipe 42 and a vent or outlet pipe 43 and in said casing is a rotatable hollow plug 44 having ports 45 spaced at 90°, said plug being actuated by the handle 51.

Let us assume that a batch of material has been extracted within a cage and basket located in the extractor, as in Fig. 2, and that a second cage and basket are located within the tub 24 on pedestal 22ᵃ, as shown in Fig. 6, said second cage and basket having been loaded with a second batch of material while the first was being extracted.

With the piston 28 in its lowest position arm 31 is swung to position over the extractor and its forked arms engaged with the collar 34 on the cage therein. Each cage has its collar 34 provided with a swinging latch 46 adapted to engage an annular recess 47 beneath a collar 48 on the upper end of the basket stem 15. Said latch is now engaged with its annular recess, whereupon valve handle 51 is turned to the position shown in Fig. 7 to cause fluid pressure to flow into the cylinder 27 and elevate both the cage and basket to the position $x$, Fig. 6, upward movement being limited by collar 29 and abutment 30. The arm 31 is then swung around until the cage and basket are over the left hand post 22, Fig. 6, whereupon the valve handle 51 is turned to exhaust position, allowing the cage and basket to seat upon the stem 23, the parts reaching the position $y$, Fig. 6. The swinging arm is then released from the cage and basket and engaged with the second cage and basket shown within the tub 24, Fig. 6, said cage and basket together being elevated, swung to position over the extractor and lowered to the same position therein as shown in Fig. 2, the clutch parts 13, 14 being engaged in driving relation as shown. The second batch of material may now be extracted as shown, the undercutting or bevelling of clutch teeth 13, 14 preventing the cage and basket from rising.

Arm 31 is now swung to engagement with the collar of the cage in position $y$, Fig. 6, but the latch 46 of said cage is disengaged from its recess 47. Thereupon the cage alone is raised from the basket and the extracted material therein, which has been thrown outwardly against the perforated wall 17 and compacted as shown at 50, Fig. 5, may be withdrawn radially from the several compartments. The cage is now dropped and re-assembled with its basket and the two together are carried or swung by the arm 31 to position $z$, Fig. 6, where they are loaded with a new batch of material to be extracted, some of the surplus water draining by gravity to the tub 24 and being discharged through pipe 25 to the sewer. When the second batch (now in the extractor) has been extracted the cycle of operations may be repeated.

Fig. 8 shows another arrangement including two extractors M, N, like that in Fig. 2, two loading tubs and pillars O, P, like that in Fig. 6, and an unloading post or pillar Q, like 22, all distributed around a single central cylinder R having a swinging arm S, like those in Fig. 2. Four baskets and cages are used with this arrangement, an extracted basket being carried from either extractor to the unloading station Q and a loaded basket being carried from a loading station O or P to the extractor, and the unloaded basket being then carried to the proper loading station. With this arrangement two operators can work from opposite sides of the machine, each operator being provided with a valve T identical with the valve shown in Fig. 7, so that by operation of either of said valves the flow of pressure to or from the central cylinder may be controlled.

In Fig. 9 a single extractor $a$ cooperates with two loading tubs $b$, one on either side of the extractor. The transfer of baskets is effected by one or the other of two swinging arms $c$ elevated by pistons in the cylinders $d$.

In this case no special unloading stations are provided, but the unloading and loading are both accomplished at the tub stations $b$. An extracted basket is removed from the extractor and carried to the empty tub station while another basket loaded at the other tub station is carried to the extractor.

Obviously many other arrangements suitable for the purpose may be provided and it is to be understood that the invention is not limited to the form shown, but is capable of considerable modification within the scope of the appended claims.

What I claim is:

1. A centrifugal extractor, comprising a frame, a rotatable spindle therein, a basket removably mounted upon said spindle for rotation therewith and provided with a bottom wall and a substantially cylindrical side wall, said basket being free of partitions, a cage removably arranged within said basket for rotation therewith and provided with a bottom wall and radial partitions which form a plurality of substantially wedge shape work receiving compartments, said cage being unprovided with a side wall or a top wall so that the compartments thereof are open at their tops and their outer ends, means for releasably latching said basket and cage together, and means for removing from the extractor said cage alone or said cage and basket if they are latched together.

2. In combination, a centrifugal extractor having a rotatable spindle, a removable basket rotatable with said spindle and provided with a bottom recess to receive the upper end portion of said spindle, and means adjacent said extractor for supporting said basket for a loading operation, said supporting means being provided with a hollow drain tub to receive said basket and with a supporting projection adapted to enter the recess of said basket.

3. A centrifugal extractor, comprising a frame, a rotatable spindle therein, an extractor basket mounted upon said spindle and adapted to be lifted therefrom for loading and unloading, and driving connections including tapered portions between said spindle and said basket so constructed and arranged as to maintain the basket seated on said spindle while driven thereby but permitting removal of said basket by simple lifting movement when the spindle is stationary.

4. A centrifugal extractor, comprising a frame, a rotatable spindle therein, an extractor basket mounted upon said spindle and adapted to be lifted therefrom for loading and unloading, said spindle and said basket having cooperating clutch teeth to provide a positive driving connection therebetween, each tooth of said spindle having an undercut side cooperating with an undercut side of a tooth of said basket for maintaining said basket seated on said spindle when said sides are in driving engagement but permitting said basket to be removed from said spindle by simple lifting movement when the spindle is stationary.

5. A centrifugal extractor, comprising a frame, a rotatable spindle therein, an extractor basket mounted upon said spindle and adapted to be lifted therefrom for loading and unloading, said spindle and said basket having cooperating clutch teeth to provide a positive driving connection therebetween, each tooth of said spindle having its sides undercut for cooperation with the undercut sides of a tooth of said basket for maintaining said basket seated on said spindle when said sides are in driving engagement but permitting said basket to be removed from said spindle by simple lifting movement when the spindle is stationary.

In testimony whereof I hereby affix my signature.

GEORGE W. JOHNSON.